June 26, 1962  E. B. SCHOTTHOEFER  3,040,721
INTERNAL COMBUSTION ENGINES OF THE TWO
CYCLE OPPOSED PISTON TYPE
Filed Aug. 17, 1960  4 Sheets-Sheet 1

INVENTOR.
EUGENE B. SCHOTTHOEFER
BY
ATTORNEY

INVENTOR.
EUGENE B. SCHOTTHOEFER

BY

ATTORNEY

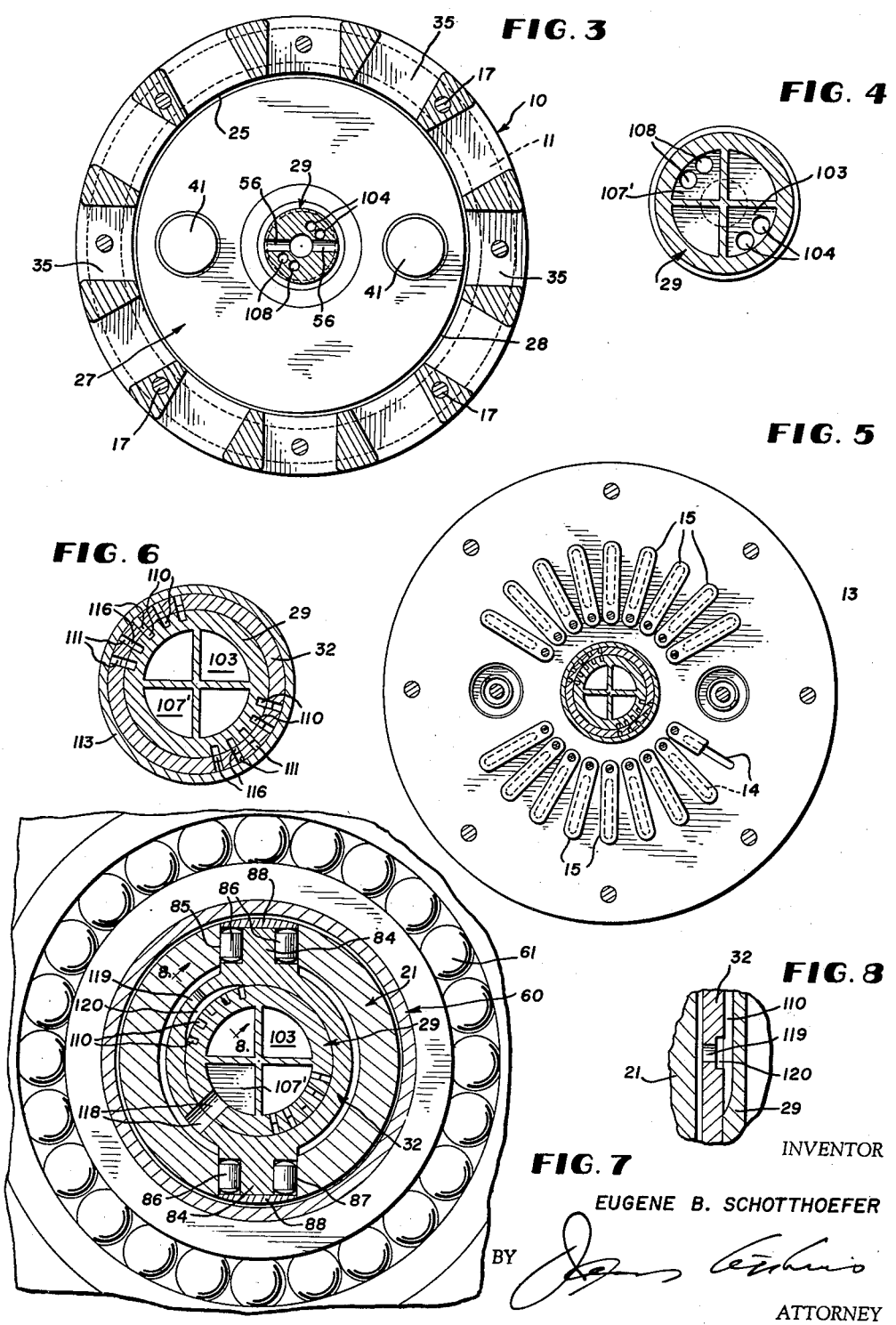

June 26, 1962
E. B. SCHOTTHOEFER
3,040,721
INTERNAL COMBUSTION ENGINES OF THE TWO
CYCLE OPPOSED PISTON TYPE
Filed Aug. 17, 1960
4 Sheets-Sheet 4
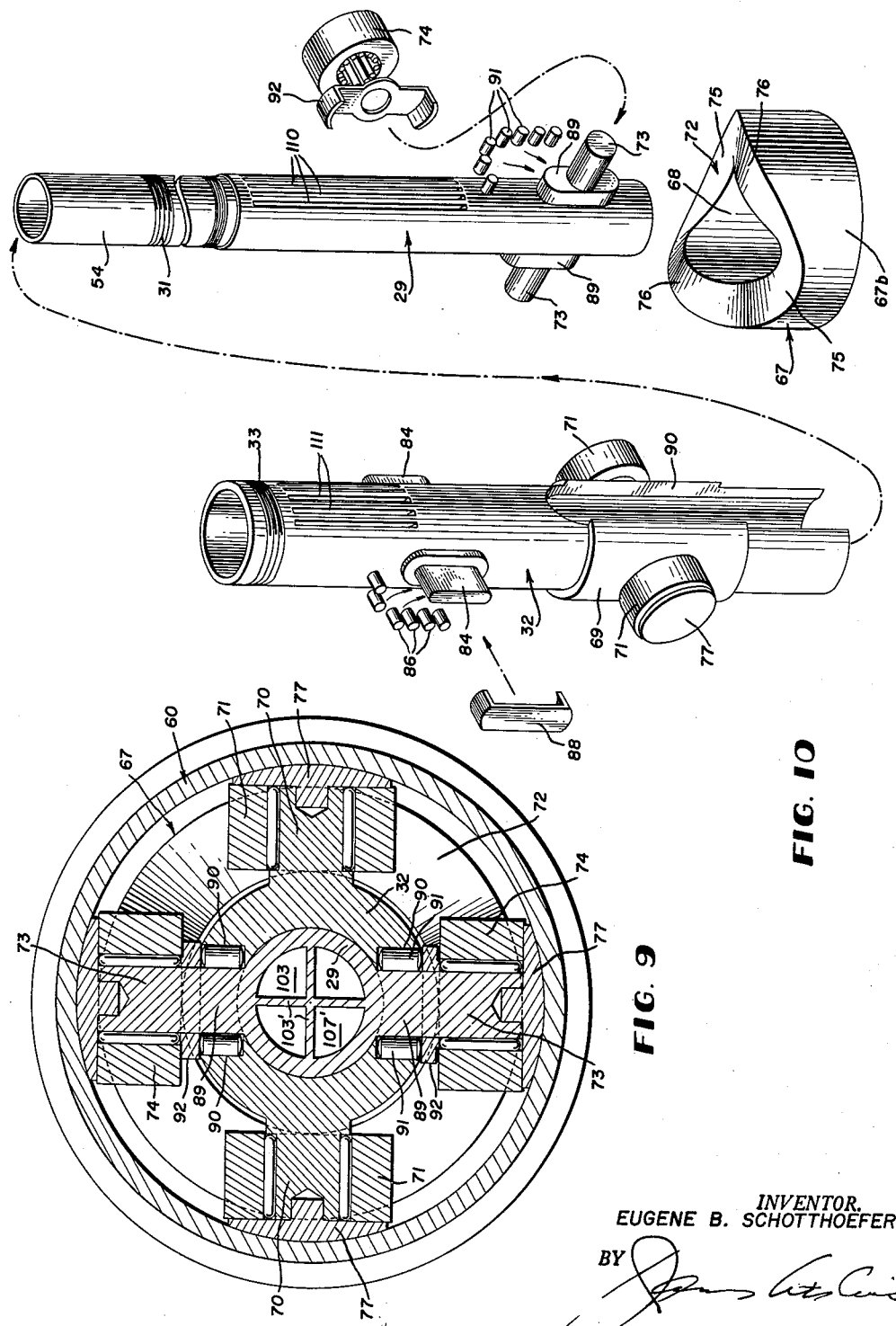
*INVENTOR.*
*EUGENE B. SCHOTTHOEFER*
BY 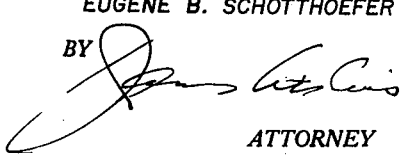
*ATTORNEY*

United States Patent Office 3,040,721
Patented June 26, 1962

3,040,721
INTERNAL COMBUSTION ENGINES OF THE TWO CYCLE OPPOSED PISTON TYPE
Eugene B. Schotthoefer, Detroit, Mich., assignor to Schotthoefer Motors Inc., Melvindale, Mich., a corporation of Michigan
Filed Aug. 17, 1960, Ser. No. 50,167
7 Claims. (Cl. 123—47)

This invention relates to internal combustion engines of the two cycle opposed piston type.

A primary object of the invention is to provide an engine for automotive and like applications which will provide the greatest possible amount of power from an engine of minimum weight, the manufacturing of the engine requiring few close machining tolerances and relatively little expensive tooling.

Another object of the invention is to provide a simplified and compact internal combustion engine including novel and simplified means for converting reciprocatory piston movement into rotary motion at the engine drive shaft.

Another object is to provide an engine of the above mentioned character in which each piston will complete four strokes for every complete revolution of the cam and flywheel.

Another object of the invention is to provide an opposed piston engine which is dynamically balanced and free of excessive vibration during operation.

A further object is to provide an engine of the mentioned type having a novel lubricating and cooling system.

Still another object is to provide substantial volumetric balance between the compression and combustion spaces in an internal combustion engine of the mentioned type.

A further object is to provide an engine of the above mentioned character wherein the intake and exhaust manifold means surrounds the telescoping piston rod structure and combustion chamber in concentric relation thereto.

Another object is to provide in an engine of the mentioned type concentrically arranged telescoping piston rods for the two reciprocatory pistons, as well as novel means associated with the piston rods to resist rotation of the pistons caused by the reaction of the rotary cam upon the same during operation of the engine.

A further important object is to provide a strong cam retaining barrel which will contain the pressures and forces exerted by the pistons during engine operation, thus eliminating the need for a heavy outer engine housing.

Another object is to provide for guiding the annular pistons of the engine upon the telescoping piston rods, thus eliminating piston-to-cylinder wall contact, except for frictional engagement of the external piston rings with the cylinder wall.

Still another object is to provide transfer valves mounted upon the opposed pistons in a novel manner to facilitate the passage of the explosive charge from the compression space into the combustion chamber or space.

Other objects and advantages of the invention will be apparent during the course of the following description.

In the accompanying drawings, forming a part of this application, and in which like numerals are employed to designate like parts throughout the same, FIGURE 1 is a central longitudinal section through the engine with parts broken away and parts in elevation and showing the opposed pistons at the outer ends of their travel, FIGURE 2 is a view similar to FIGURE 1 showing the pistons at the inner limits of their travel, FIGURE 3 is a transverse section taken on line 3—3 of FIGURE 1, FIGURE 4 is a similar section taken on line 4—4 of FIGURE 1.

FIGURE 5 is a similar section taken on line 5—5 of FIGURE 1,

FIGURE 6 is a similar section taken on line 6—6 of FIGURE 1,

FIGURE 7 is a similar section taken on line 7—7 of FIGURE 1,

FIGURE 8 is a fragmentary radial section taken on line 8—8 of FIGURE 7,

FIGURE 9 is a transverse section taken on line 9—9 of FIGURE 1,

FIGURE 10 is an exploded perspective view of tubular interfitting piston rods and associated elements.

Figure 1:
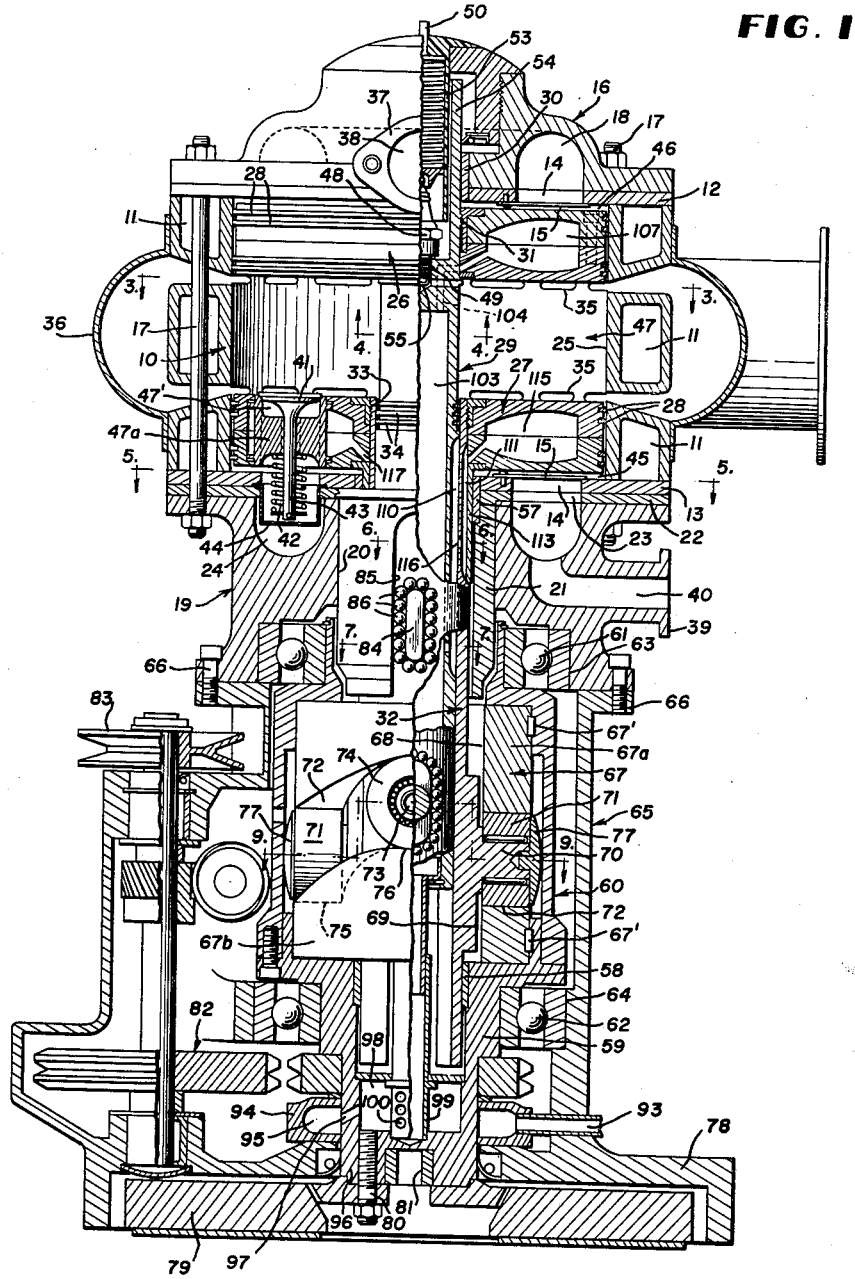

In the drawings, wherein for the purpose of illustration is shown a preferred embodiment of the invention, the numeral 10 designates a power cylinder for the engine, defining compression and combustion chambers to be described. The cylinder 10 is jacketed at 11 to provide for cooling the same with water introduced into the jacket in any preferred manner, not shown. Covering the top and bottom ends of the cylinder 10 are flat reed valve plates 12 and 13, each having a multiplicity of circumferentially equidistantly spaced slots 14 formed therethrough, and which slots are normally covered upon the inner opposed faces of the plates 12 and 13 by a corresponding number of resilient reed valves 15, as shown.

Above the upper reed valve plate 12, an upper cylinder cover 16 is provided and bears directly upon the plate 12 and is rigidly secured thereto by axial bolts 17, which bolts engage through the water jackets 11 as shown. The upper cylinder cover 16 is recessed at 18 in its lower face to form an upper annular intake manifold section, communicating with the slots 14 of the upper reed valve plate 12.

Below the lower reed valve plate 13, an annular lower cylinder cover 19 is provided and rigidly secured to the cylinder 10 by the previously described bolts 17. The bore 20 of the lower cylinder cover 19 receives an anchor sleeve 21 for a purpose to be described, having a top annular flange 22 integral therewith and interposed between the reed valve plate 13 and cylinder cover 19, as shown. The flange 22 is slotted at 23 in the same manner as the reed valve plates 12 and 13, and the slots 14 of the lower reed valve plate 13 are in registration with the slots 23 of flange 22. The lower cylinder cover 19 is recessed at 24 is in top face to form an annular lower intake manifold section communicating with the interior of the cylinder 10 through the mentioned slots of the reed valve plate 13.

Mounted within the bore 25 of cylinder 10 for opposed reciprocation are upper and lower annular pistons 26 and 27, having external piston rings 28 which frictionally engage the cylinder bore 25. The pistons 26 and 27 are not primarily guided by the cylinder bore 25 but are guided centrally by telescoping concentric piston rods to be described. The upper piston 26 is rigidly mounted upon a first or inner piston rod 29, mounted for axial reciprocation with the upper piston and guided near its upper end and within the cylinder cover 16 by a sleeve bearing 30. The upper piston has screw-threaded engagement at 31 with the inner piston rod 29, or it may be rigidly connected with this piston rod in any other preferred manner.

A second or outer axial piston rod 32 engages telescopically over the inner piston rod 29 and is received by the bore of the lower piston 27 and rigidly connected with the latter at 33. The upper end of outer piston rod 32 terminates flush with the top face of the lower piston 27, FIGURE 1. Piston rings 34 seated in grooves within the inner piston rod 29 frictionally engage the bore of the outer piston rod 32 to seal the latter. The lower piston 27 reciprocates within the cylinder bore 25 together with the outer piston rod and relative to and in opposed relation with the upper piston 26 and its piston rod 29.

Immediately below and above the upper and lower pistons 26 and 27, when the latter are fully separated, FIGURE 1, the clyinder 10 has circumferentially spaced exhaust ports 35, arranged in annular rows, and communicating with an annular exhaust manifold 36 which surrounds the cylinder 10 concentrically and at its longitudinal center. The exhaust manifold 36 is thus midway between the intake manifold sections 18 and 24 and considerably larger in diameter than the latter.

A mounting flange 37 for a carburetor, not shown, is provided upon upper cylinder cover 16 and having a passage 38 communicating directly with intake manifold section 18. A similar carburetor mounting flange 39 may be provided upon the lower cylinder cover 19, having a passage 40 communicating with the lower manifold section 24.

Each opposed piston 26 and 27 is provided at diametrically opposed points thereon with a pair of transfer valves 41, maintained normally closed by springs 42, which extend with the valve stems 43 into cup-like covers 44 which depend rigidly from the flange 22 and project into the intake manifold sections 18 and 24.

Compression spaces 45 and 46 are provided between the ends of cylinder bore 25 and the outer faces of pistons 26 and 27, and a single combustion chamber or space 47 is provided within the cylinder bore between the opposed faces of the pistons 26 and 27. The transfer valves 41 open automatically and in opposite directions in response to the compression built up in compression spaces 45 and 46 when the opposed pistons approach the outer end of their travel on the compression stroke, FIGURE 1. This will admit the compressed charge into the combustion chamber 47 between the pistons and allow for scavenging through the exhaust ports 35, prior to the further compression and ignition of the charge in the combustion chamber 47 when the pistons move together in the cylinder bore 25, and while transfer valves 41 are closed, FIGURE 2. The pistons 26 and 27 have openings 47' formed therethrough adjacent the transfer valve 41 so that the compressed charge may flow freely from the outer ends of the pistons to the combustion space 47. These openings 47' are unobstructed except for radial webs 47a which carry the usual guides for valve stems 43.

A spark plug 48 is secured centrally at 49 within the upper portion of inner piston rod 29, just below the upper cylinder cover 16. A spark conducting element 50 exposed through the top of cover 16 is electrically connected with the upper spark plug terminal 51 through a compressible coil spring 52, housed within a sleeve 53 of insulating material, mounted upon the cover 16 and disposed telescopically within the end portion 54 of inner piston rod 29. This insulating sleeve 53 shields and insulates the conducting spring 52 and spark plug, as well as the terminal 50. The reason for the conducting spring 52 in the assembly is that the spark plug 48 is bodily mounted upon the inner piston rod 29 for reciprocation with the latter. Therefore, a yielding or moving connection between the spark plug and fixed terminal 50 is necessary. The inner connecting rod 29 is provided adjacent the lower spark plug electrodes 55 with radial openings 56, FIGURE 3, to receive the compressed charge in the combustion chamber 47 so that ignition may readily take place.

The outer piston rod 32 has guided engagement within the anchor sleeve 21 at 57 in the form of a sleeve bearing, and the lower end of piston rod 32 is similarly guided within a sleeve bearing 58, carried within the lower cap section 59 of a sturdy annular cam retaining barrel 60. The lower end of the inner piston rod 29 terminates above the lower end of outer piston rod 32, as shown in the drawings.

The cam retaining barrel 60 including lower cap section 59, rigid therewith, is mounted for free rotation near its upper and lower ends within ball bearings 61 and 62, mounted respectively within recesses 63 and 64 of lower cylinder cover 19 and a main case 65 which surrounds the cam barrel and associated elements as shown. The upper end of main case 65 is bolted to lower cylinder cover 19 at 66.

Mounted for rotation with the cam retaining barrel 60 as a unit is a cylindrical cam 67, rigidly keyed to the cam barrel 60 at 67'. The outer piston rod 32 extends axially through the bore 68 of cam 67 and has an enlarged hub portion 69 disposed therein, carrying radially extending trunnions 70 at diametrically opposite sides thereof, having frictionless rollers 71 journaled thereon and engaging a sinuous cam slot 72, formed through the side wall of the cam and extending entirely around the cam circumferentially. In effect, the sinuous cam slot 72 divides the cam 67 into two opposed identical cam parts 67a and 67b, both rigidly housed within the cam barrel 60 for rotation therewith as a unit. The trunnions 70 and rollers 71 of outer piston rod 32 are disposed at diametrically opposed points upon the outer piston rod and cam.

Similarly, near the lower end of inner piston rod 29, the same is provided with diametrically opposed radial trunnions 73, carrying frictionless rollers 74, engaging within the sinuous cam slot 72 at a pair of points spaced ninety degrees circumferentially from the rollers 71 of the outer piston rod.

The cam slot 72 has a pair of low cam portions 75 spaced apart 180 degrees circumferentially, and a pair of high cam parts 76 spaced apart 180 degrees, and spaced ninety degrees circumferentially from the low cam parts 75. Thus, the cam followers or rollers 71 of outer piston rod 32 will ride upon the low cam parts 75 when the rollers 74 of inner piston rod 29 are riding upon high cam parts 76, and vice-versa. Accordingly, the continuous opposed reciprocation of pistons 26 and 27 with their telescoped piston rods 29 and 32 imparts continuous rotation to the cam 67 and the cam barrel 60 as a unit. Spherically curved spacer caps 77 are provided upon the trunnions 70 and 73 to prevent outward radial movement of the rollers 71 and 74, and the spherical faces of these caps substantially abut the bore of cam barrel 60, as shown.

The main case 65 has a lower recessed flange 78 receiving a flywheel 79, rigidly secured at 80 to the lower end of cam barrel cap 59. A pilot bushing 81 is disposed centrally within a recess in the lower end of cap 59 and locked therein by the flywheel. During use, one end of a splined shaft, or the like, driven by the engine is received within the pilot bushing 81, while a clutch face on the shaft to be driven engages the outer face of the flywheel 79 in the usual manner. Any other conventional means for utilizing the power of the engine may be employed as desired.

In order to drive accessory units, gearing 82 connected with the rotary element 59 is contained within the case 65 at one side of the cam barrel 60, and the power for driving accessories is taken off through an external pulley 83 or like means.

Means are provided in association with the inner and outer piston rods 29 and 32 to prevent the latter and the pistons 26 and 27 from revolving with the cam 67, in response to the reaction from the torque load placed upon the engine through the flywheel. Toward this end, adjacent the anchor sleeve 21, outer piston rod 32 carries a pair of integral diametrically opposed axially elongated keys or projections 84, projecting through axially elongated slots 85 formed through the fixed anchor sleeve 21, see FIGURE 7. A multiplicity of frictionless rollers 86 are interposed in the endless raceway 87 formed between each slot 85 and the associated key 84. Retainer cages 88 serve to close the otherwise open ends of the raceways 87 for rollers 86, and these retainer cages thus assure that the rollers 86 will recirculate through the endless passageways 87 at all times during the reciprocation of piston rod 32. The retainer cages 88 are omitted in FIGURES 1 and 2 for the purpose of clearly illustrating other elements but are shown in FIGURE 10 and in section in FIGURE 7.

It is thus seen that by means of the construction shown particularly in FIGURES 7 and 10 that the outer piston rod 32 is free to reciprocate axially relative to the inner piston rod and the anchor sleeve 21, but the outer piston rod is positively restrained by the keys 84 and associated elements against rotation due to the mentioned reaction through the flywheel 79 while the engine is under load.

In like manner, with continued reference to the drawings, FIGURES 9 and 10 in particular, inner piston rod 29 is provided at diametrically opposed points and adjacent trunnions 73 and inwardly thereof with axially elongated radial keys 89, integral therewith and being somewhat wider than the previously described keys 84. The keys 89 are elongated axially of the piston rod 29 and the previously described trunnions 73 are formed upon the keys 89 as shown in FIGURE 10. The keys 89 engage through elongated slots 90, formed through the outer piston rod 32, and a multiplicity of frictionless rollers 91 are arranged between the keys 89 and the side wall of slot 90 and retained therein by cap elements 92, FIGURES 9 and 10, similar to the previously described cap elements 88. The cap elements are all omitted from FIGURES 1 and 2 for the purpose of clarity. The construction and operation of the keys 89 and associated elements shown in FIGURE 9 is substantially the same as the previously described corresponding elements on the outer piston rod 32 shown in FIGURE 7. With the construction shown in FIGURE 9, it may now be seen that the inner piston rod 29 is free to reciprocate axially within the outer piston rod 32 but is constrained against rotation therein when the engine is under load.

It may also be observed that the keys 89 absorb the reaction imparted to the inner piston rod 29 to resist rotation thereof, whereas the keys 84 resist the rotational reaction on both the inner and outer piston rods, due to being connected with the fixed anchor sleeve 21. When the engine is under load, there is no possibility of rotation being imparted to either the inner or outer piston rods or the two pistons carried thereby. The pistons and piston rods will reciprocate continuously and the cam 67 will rotate, but there can be no counter-rotation of the pistons and their rods due to the constructions shown in FIGURES 7 and 9.

Means are provided to lubricate and cool certain elements of the engine with oil under pressure. Such means comprises a suitable inlet fitting 93 for oil under pressure from a suitable source, not shown, the oil entering the engine through the fitting 93 passing into a collector ring 94 having an annular chamber 95 surrounding the lower portion 96 of cap 59 of cam barrel 60. This lower portion 96 has a radial port 97 to admit lubricating oil to a chamber 98, surrounding a tube section 99 having inlet ports 100. The oil flows upwardly through tube section 99 and through an upper telescoping tube section 101 which moves axially relative to tube section 99. The oil from the upper tube section 101 flows upwardly through one quadrant passage 103, FIGURE 9, provided in the inner piston rod 29 by cross partitions 103' which extend for the length thereof. Upon reaching the upper end portion of the inner piston rod 29, the lubricating and cooling oil enters ports 104 formed through the inner piston rod and leading to a generally radial port 105 in the upper piston 26, leading to a large internal annular cooling chamber 107 thereof. The flow of oil through the annular chamber 107 serves materially to cool the upper piston 26 during the operation of the engine.

From the annular chamber 107 of the upper piston, the oil re-enters a quadrant passage 107' of the inner piston rod 29 through ports 108 provided for this purpose in the upper piston and the inner piston rod. The oil now flows downwardly through the passage 107' and the oil enters the region of the rollers 71 and 74 and associated elements, and ultimately passes outwardly radially under the influence of centrifugal force through suitable openings 109 in the cam barrel 60 and enters the main case 65, from which the oil is returned to a sump by a suitable pump, not shown.

Intermediate their ends, the inner and outer piston rods 29 and 32 have oil grooves 110 and 111 formed therein which remain constantly in communication during engine operation. A port 112 is formed through the inner piston rod in communication with the groove 110. A sleeve 113 secured to the lower piston 27 serves to cover the oil groove 111 of the outer piston rod. A generally radial port 114 leads from the oil groove 111 to an interior annular cooling chamber 115 in the lower piston 27, corresponding to the previously described chamber 107 and for the same purpose. Another radial port 116 serves continuously to interconnect each adjacent pair of grooves 110 and 111, as shown.

From the annular chamber 115 of lower piston 27, the oil returns through a generally radial port 117 to the passage 107' of the inner piston rod 29, and the oil is returned through the grooves 110 and 111 and associated ports to the interior of case 65 in the same manner previously described in connection with the opposite side of the lubricating system. With particular reference to FIGURE 7, registering ports 118 formed through the inner and outer piston rods and a port 119 and recess 120 in the outer piston rod 32, FIGURE 8, serve further to connect the oil passage 107' with the oil grooves of the inner piston rod 29.

It is to be understood that the form of the invention herewith shown and described is to be taken as a preferred example of the same, and that various changes in the shape, size and arrangement of parts may be resorted to, without departing from the spirit of the invention or the scope of the subjoined claims.

Figure 2:
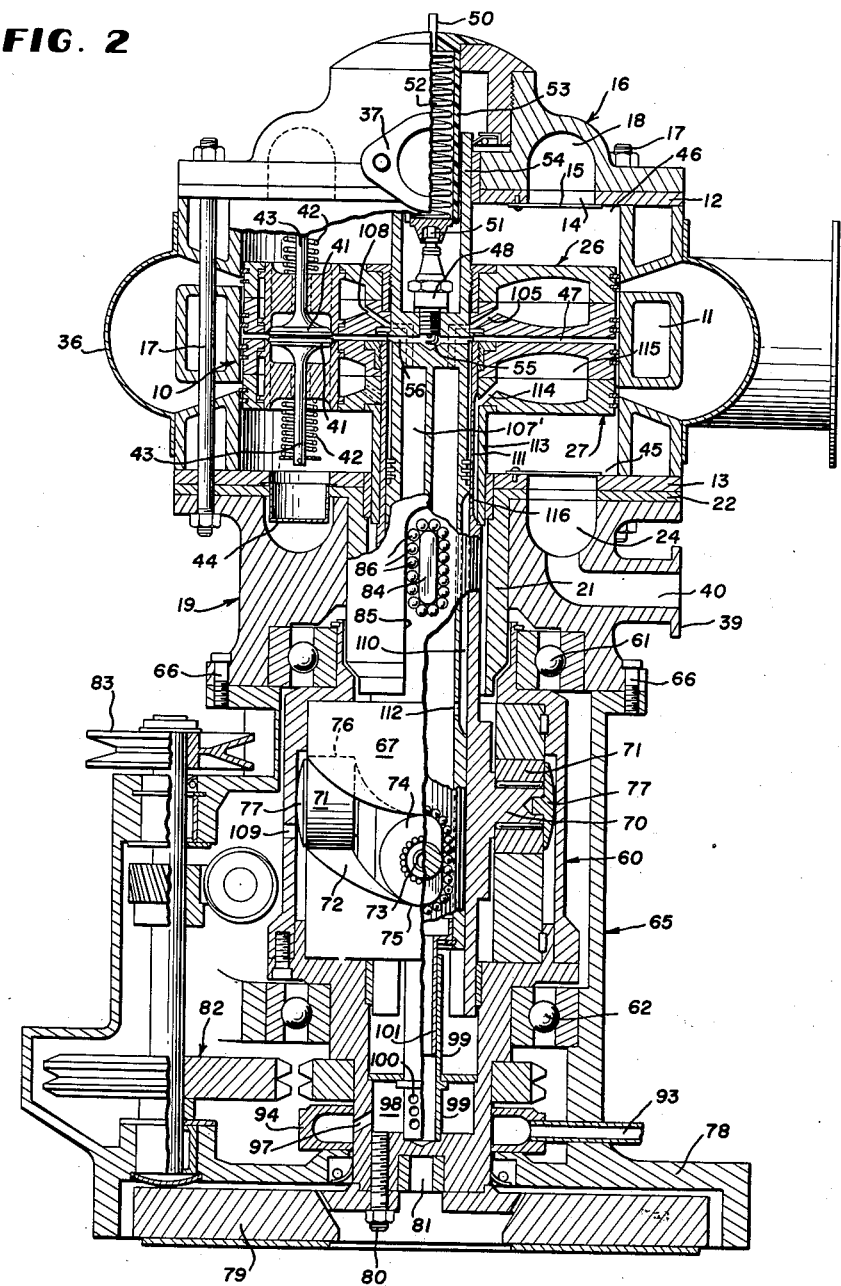
Figure 2:
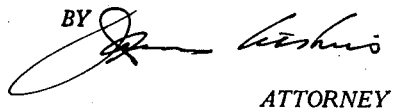

For convenience of description in connection with FIGURES 1 and 2, the engine has been described with reference to certain parts as being "upper" and "lower" parts of the engine. It should be understood that in actual practice the engine may be employed in a horizontal position or vertically or at any desired intermediate angle. The description in this respect is not be construed in any limiting sense, as the engine will operate efficiently in all positions.

Having thus described my invention, I claim:

1. A two cycle opposed piston internal combustion engine comprising a cylinder, a pair of pistons mounted within said cylinder for opposed reciprocation therein, a pair of telescopically interfitting reciprocatory piston rods secured to said pistons for movement therewith, transfer valves carried by said pistons for admitting a combustible charge into the space between the pistons from spaces in said cylinder outwardly of the piston, means for introducing the combustible charge into the ends of the cylinder outwardly of the pistons, means to exhaust burned combustion products from the space in the cylinder between the pistons, means for igniting said charge in said space between the pistons when the pistons move together, casing, rotary cam means journaled upon said casing and having a sinuous cam surface, cam follower means carried by said telescoping reciprocatory piston rods and engaging said cam surface to rotate the cam means and thereby change the linear motion of said pistons into rotary motion, and reaction means associated with said piston rods to resist rotation of the latter with said pistons when the engine is under load.

2. An internal combustion engine comprising a cylinder having exhaust port means spaced from the ends of the cylinder and intake port means at opposite ends of the cylinder for admitting a combustible charge thereto, a pair of opposed pistons mounted within said cylinder for reciprocation and being annular, transfer valve means bodily mounted upon said pistons and opening inwardly in opposed relation when the pistons are near the outer ends of their travel for compressing the charge near the ends of the cylinder, ignition means secured to one of said pistons and movable therewith and adapted to ignite the charge between the pistons when the latter are near the inner end of their travel, telescoping tubular piston rods secured to said pistons for reciprocation therewith and being concentric with the annular pistons and secured within the bores thereof and extending axially beyond corresponding ends of said pistons and said cylinder, stationary casing means secured to said cylinder and surrounding said telescoping piston rods, rotary cam means journaled within the casing means and surrounding said piston rods, cam follower means carried by the piston rods and engaging the cam means to rotate the latter when the pistons and piston rods reciprocate in opposed relation, flywheel means carried by said rotary cam means, and reciprocatory interconnecting means for said piston rods and engaging said stationary casing means and resisting rotation of the piston rods and pistons when the engine is under load.

3. In an opposed piston internal combustion engine, as a sub-combination, a cylinder, cover means for the opposite ends of said cylinder having intake manifold means formed therein, intake valve means carried by said cover means adjacent the intake manifold means, an exhaust manifold surrounding said cylinder intermediate its ends, said cylinder having annular rows of exhaust ports inwardly of its ends and communicating with said exhaust manifold, a pair of opposed pistons mounted within said cylinder for reciprocation, ignition means carried by one of said pistons and movable therewith, and normally closed inwardly opening transfer valves carried by said pistons and adapted to open when the pistons are near the ends of said cylinder for compressing the combustible mixture.

4. In an internal combustion engine, a cylinder, a pair of opposed annular pistons mounted within said cylinder for reciprocation, plates covering the opposite ends of said cylinder and having circumferentially spaced radial slots, inwardly opening reed valves secured to said plates and normally covering said slots, first and second cover elements mounted upon said plates near the ends of said cylinder and secured to the plates and cylinder, said cover elements having annular intake manifold recesses formed in their inner faces adjacent said slots and reed valves, water jacket means surrounding said cylinder between said plates and cover elements, an exhaust manifold surrounding said cylinder substantially midway between said plates, said cylinder provided in its side wall and inwardly of its ends with annular rows of circumferentially spaced exhaust ports communicating with the exhaust manifold, a pair of normally closed inwardly opening transfer valves carried by said pistons at diametrically opposed points upon the same, said pistons having axial passages formed therethrough adjacent said transfer valves and communicating with said annular intake manifold recesses, a first piston rod secured within the bore of one of said annular pistons for reciprocation therewith, a second piston rod secured within the bore of the other annular piston for reciprocation therewith and being tubular and receiving the first piston rod telescopically, a spark plug secured to the first piston rod adjacent the piston of such rod for movement therewith, expansible current conducting means interconnecting said spark plug and said first cover element to conduct current to the spark plug during reciprocation of the latter, and cam means connected with said piston rods for converting linear motion of the latter into rotary motion.

5. An internal combustion engine according to claim 4, and wherein said cam means comprises casing means secured to said cylinder, a rotary cam journaled upon the casing means and having a wavy cam slot, radial trunnions carried by said piston rods and engaging said cam slot at circumferentially spaced points upon the same, flywheel means connected with said rotary cam for rotation therewith, and means interconnecting said piston rods and casing means to prevent rotation of the piston rods relative to each other and relative to the casing means during reciprocation of the piston rods and while the engine is under load.

6. An internal combustion engine according to claim 4, wherein said annular pistons have internal annular cooling chambers, and passage means formed in said piston rods and communicating with said chambers to circulate lubricating oil therethrough to cool the pistons during the operation of the engine.

7. An internal combustion engine comprising a single cylinder having a relatively large bore, a pair of opposed annular pistons mounted within the bore of said cylinder and having external piston rings frictionally engaging said bore, telescopically interfitting piston rods secured centrally to the bores of said pistons and being of relatively small diameters and elongated and serving to primarily guide the pistons during reciprocation of the latter and extending beyond one end of the cylinder, means to introduce a combustible charge into opposite ends of said cylinder outwardly of said pistons, means to exhaust burned combustion products from said cylinder intermediate its ends and between said pistons, transfer valve means bodily carried by said pistons within said cylinder, ignition means carried by one piston and movable therewith and adapted to ignite the charge between the pistons when the latter are close together near the longitudinal center of the cylinder, and rotary cam means connected with said piston rods and spaced from one end of said cylinder and including power take off means for the engine.

References Cited in the file of this patent

UNITED STATES PATENTS

| 1,183,904 | Palmer | May 23, 1916 |
| 1,693,024 | Drummond | Nov. 27, 1928 |
| 2,288,480 | Palumbo | June 30, 1942 |
| 2,401,466 | Davis et al. | June 4, 1946 |
| 2,578,559 | Korsgren | Dec. 11, 1951 |

FOREIGN PATENTS

| 545,371 | France | Oct. 11, 1922 |
| 407,072 | Great Britain | Mar. 6, 1934 |